(12) United States Patent
Jeong et al.

(10) Patent No.: US 11,991,116 B2
(45) Date of Patent: *May 21, 2024

(54) METHOD FOR OPERATING RELATION SERVER AND SYSTEM USING THE SAME

(71) Applicant: KAIFI, LLC, Lewisville, TX (US)

(72) Inventors: Young-Sic Jeong, Daejeon (KR); Sang-Keun Yoo, Sejong (KR); Yong-Woon Kim, Asan-si (KR)

(73) Assignee: KAIFI, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/120,202

(22) Filed: Mar. 10, 2023

(65) Prior Publication Data

US 2023/0216934 A1 Jul. 6, 2023

Related U.S. Application Data

(63) Continuation of application No. 17/355,835, filed on Jun. 23, 2021, now Pat. No. 11,606,445, which is a
(Continued)

(30) Foreign Application Priority Data

Nov. 3, 2014 (KR) .................. 10-2014-0151327
Nov. 3, 2014 (KR) .................. 10-2014-0151328
(Continued)

(51) Int. Cl.
*H04L 5/00* (2006.01)
*H04L 67/566* (2022.01)

(52) U.S. Cl.
CPC .......... *H04L 5/0053* (2013.01); *H04L 67/566* (2022.05)

(58) Field of Classification Search
CPC ............................ H04L 67/566; H04L 5/0053
(Continued)

(56) References Cited

U.S. PATENT DOCUMENTS 6,993,398 B2  1/2006 Li et al.
8,060,588 B2  11/2011 Yook et al.
(Continued)

FOREIGN PATENT DOCUMENTS

KR  10-2004-0090600  10/2004
KR  10-2010-0129488  12/2010
(Continued)

OTHER PUBLICATIONS

MobileIron FAQ, captured Oct. 13, 2013, https://www,mobileiron.com/en/resources/faq.

*Primary Examiner* — Wing F Chan
*Assistant Examiner* — Leon Y Tseng
(74) *Attorney, Agent, or Firm* — BROADVIEW IP LAW, PC (57) ABSTRACT

Disclosed herein are a method for operating a relation server and a system using the method. The method for operating the relation server for managing relations between machines includes generating, by the relation server, a capability set required to execute a command by analyzing the command, and grouping, by the relation server, machines that are to execute the command, among the machines, based on the generated capability set, and capability parameters and status parameters of respective machines that have been previously registered in the relation server or that are extractable by the relation server.

24 Claims, 2 Drawing Sheets

Related U.S. Application Data continuation of application No. 16/894,167, filed on Jun. 5, 2020, now Pat. No. 11,082,518, which is a continuation of application No. 14/931,213, filed on Nov. 3, 2015, now Pat. No. 10,701,169.

(30) Foreign Application Priority Data

| Jan. 23, 2015 | (KR) | ......................... 10-2015-0011217 |
| Jun. 30, 2015 | (KR) | ......................... 10-2015-0093338 |
| Oct. 19, 2015 | (KR) | ......................... 10-2015-0145571 |
| Nov. 3, 2015 | (KR) | ......................... 10-2015-0153925 |

(58) Field of Classification Search
USPC ........................................................ 709/226
See application file for complete search history.

(56) References Cited

U.S. PATENT DOCUMENTS

| 9,319,484 B2 | 4/2016 | Tanimoto |
| 2012/0054065 A1 | 3/2012 | Sung et al. |
| 2014/0177605 A1 | 6/2014 | Kwon et al. |
| 2014/0317261 A1 | 10/2014 | Shatzkamer et al. |

FOREIGN PATENT DOCUMENTS

| KR | 10-1406854 | 6/2014 |
| KR | 10-2014-0109940 | 9/2014 |
| WO | 2013/106204 | 7/2013 |

METHOD FOR OPERATING RELATION SERVER AND SYSTEM USING THE SAME

CROSS REFERENCE TO RELATED APPLICATIONS

This is a continuation application of U.S. patent application Ser. No. 17/355,835, filed Jun. 23, 2021 (currently pending), the disclosure of which is incorporated herein by reference in its entirety. U.S. patent application Ser. No. 17/355,835 is a continuation application of U.S. patent application Ser. No. 16/894,167, filed Jun. 5, 2020, now U.S. Pat. No. 11,082,518, issued Aug. 3, 2021, the disclosure of which is incorporated herein by reference in its entirety. U.S. patent application Ser. No. 16/894,167 is a continuation application of U.S. patent application Ser. No. 14/931,213, filed Nov. 3, 2015, now U.S. Pat. No. 10,701,169, issued Jun. 30, 2020, the disclosure of which is incorporated herein by reference in its entirety. U.S. patent application Ser. No. 14/931,213 claims the priority benefit of Korean Patent Application Nos. 10-2014-0151328 filed Nov. 3, 2014, 10-2014-0151327 filed Nov. 3, 2014, 10-2015-0011217 filed Jan. 23, 2015, 10-2015-0093338 filed Jun. 30, 2015, 10-2015-0145571 filed Oct. 19, 2015, and 10-2015-0153925 filed Nov. 3, 2015 which are hereby incorporated by reference in their entirety into this application.

BACKGROUND OF THE INVENTION

1. Technical Field

Embodiments based on the concept of the present invention generally relate to a method for operating a relation server and a system using the method and, more particularly, to a method for operating a relation server and a system using the method, which manage relations between machines that are required in order to execute an externally received command.

2. Description of the Related Art

Recently, systems for connecting machines through a network and sharing information between the machines have been applied to various fields, such as health care, telemetry, smart homes, and smart cars, as well as household appliances and electronic devices.

Therefore, when various machines form collaborative relations, methods for managing the relations between the machines are required.

SUMMARY OF THE INVENTION

Accordingly, the present invention has been made keeping in mind the above problems occurring in the prior art, and an object of the present invention is to provide a method for operating a relation server and a system using the method, which manage relations between machines that are required in order to execute externally received commands.

In accordance with an aspect of the present invention to accomplish the above object, there is provided a method for operating a relation server, the relation server managing relations between machines, including generating, by the relation server, a capability set required to execute a command by analyzing the command, and grouping, by the relation server, machines that are to execute the command, among the machines, based on the generated capability set, and capability parameters and status parameters of respective machines that have been previously registered in the relation server or that are extractable by the relation server.

Each of the capability parameters may include sub-parameters related to at least one of a title of an executable process, an input parameter, an output parameter, a process processing time, process processing conditions, and executable functions.

Each of the status parameters may include sub-parameters related to at least one of a current active state, current availability or unavailability, a current process, a scheduled termination time for the current process state, a currently executed function, and a scheduled termination time of the currently executed function.

A machine profile including information about each of the machines may include a capability parameter and a status parameter, and the machine profile may further include at least one of a machine ID parameter, a user ID parameter, a group ID parameter, a machine operating system parameter, and a machine interface parameter.

The machine operating system parameter may include sub-parameters related to a type and a version of an operating system used by each of the machines.

The machine interface parameter may include sub-parameters related to interfaces and interface protocols between the machines, and interfaces and interface protocols between each machine and the relation server.

The method may further include forming relations between the grouped machines based on the capability set, capability parameters and status parameters of the respective grouped machines.

The relations may include information about the grouped machines and information about a task processing schedule of the grouped machines.

The method may further include generating, by the relation server, a relation profile based on the relations.

The relation profile may include at least one of a capability set parameter, grouped machine parameters, a work group ID parameter, a task description parameter, and a task processing schedule parameter.

The task processing schedule parameter may include sub-parameters related to at least one of a process start time of each process, process start conditions, machine IDs of allocated machines, functions that are used, a start time of each of the functions, a predicted process termination time, interface parameters, and process termination conditions.

The method may further include operating, by the relation server, the grouped machines according to a task processing schedule included in the relation profile.

The method may further include, after completing the execution of the command, releasing, by the relation server.

The method may further include requesting, by the relation server, an intervention of a user based on processes included in the relation profile.

The intervention of the user may include an approval or a selection of the user related to an execution of the process.

The method may further include re-grouping, by the relation server, the machines according to the approval or the selection of the user, and forming, by the relation server, new relations between the re-grouped machines.

The method may further include generating, by the relation server, a new relation profile based on the new relations.

In accordance with another aspect of the present invention to accomplish the above object, there is provided a system, comprising multiple machines, and a relation server for managing relations between the multiple machines, wherein the relation server generates a capability set required to execute a command by analyzing the command, and groups machines that are to execute the command, among the machines, based on the generated capability set, and capability parameters and status parameters of respective machines that have been previously registered in the relation server or that are extractable by the relation server.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Specific structural or functional descriptions related to embodiments based on the concept of the present invention and disclosed in the present specification are merely illustrated to describe embodiments based on the concept of the present invention, and the embodiments based on the concept of the present invention may be implemented in various forms and should not be interpreted as being limited to the above embodiments described in the present specification.

The embodiments based on the concept of the present invention may be modified in various manners and may have various forms, so that embodiments are intended to be illustrated in the drawings and described in detail in the present specification. However, it should be understood that those embodiments are not intended to limit the embodiments based on the concept of the present invention to specific disclosure forms and they include all changes, equivalents or modifications included in the spirit and scope of the present invention.

The terms such as "first" or "second" may be used to describe various components, but those components should not be limited by the terms. The terms are merely used to distinguish one component from other components, and a first component may be designated as a second component and a second component may be designated as a first component in the similar manner, without departing from the scope based on the concept of the present invention.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components. Other representations describing relationships among components, that is, "between" and "directly between" or "adjacent to," and "directly adjacent to," should be interpreted in similar manners.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof that are described in the present specification are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Figure 1:
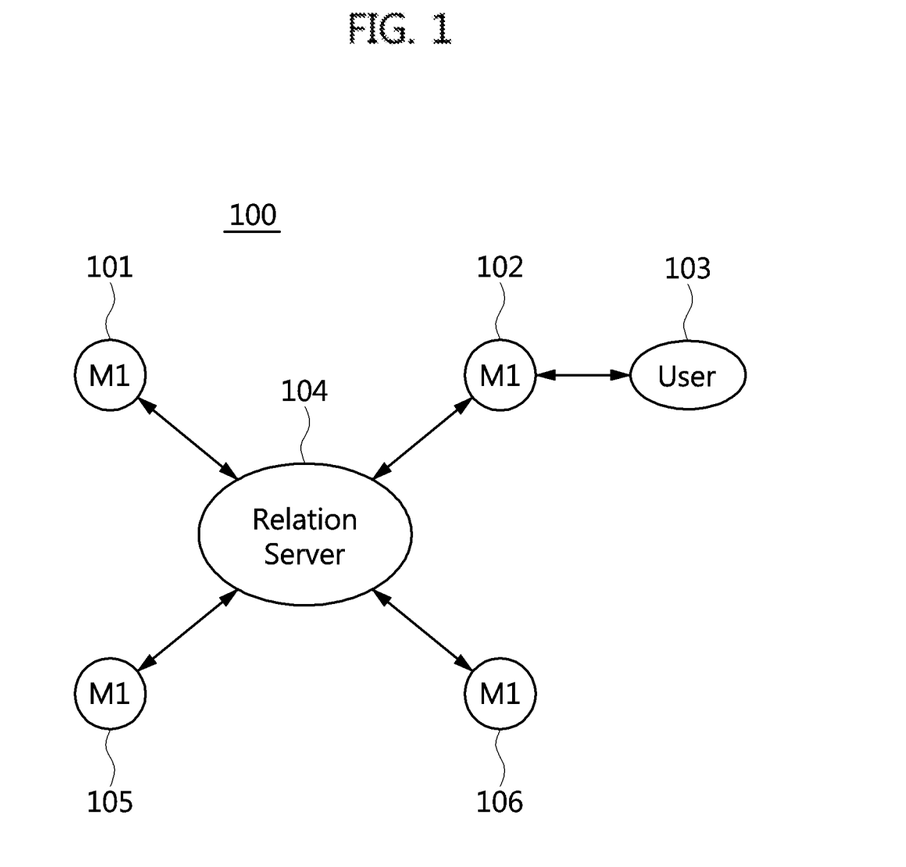
FIG. 1 is a conceptual diagram showing a system according to an embodiment of the present invention.

FIG. 1 is a conceptual diagram showing a system according to an embodiment of the present invention.

Referring to FIG. 1, a system 100 according to an embodiment of the present invention may include multiple machines 101, 102, 105, and 106, and a relation server 104.

In FIG. 1, for the convenience of description, a user 103 is shown together with the above components, and may be a user or a user terminal.

Although four machines 101, 102, 105, and 106 are illustrated in FIG. 1 by way of example, the technical scope of the present invention should not be construed as being limited to any specific number of machines included in the system 100.

Each of multiple machines 101, 102, 105, and 106 may have its own machine profile.

The machine profile means data including various types of information related to each machine 101, 102, 105, or 106. According to an embodiment, the machine profile may include at least one of the parameters of the machine profile presented in the following Table 1. Each of the machine profile parameters may include at least one sub-parameter.

In the present specification, the term "sub-parameter" may denote a parameter including detailed items for the corresponding parameter.

TABLE 1

| Parameters of machine profile | Sub-parameters |
| --- | --- |
| Status | Current operation (active) state |
| | Current availability or |
| | unavailability (standby) |
| | Current process |
| | Scheduled termination time of |
| | current process |
| | Currently executed function |
| | Scheduled termination time of |
| | currently executed function |
| Capability | Title of process |
| | Input parameter |
| | Output parameter |
| | Process processing time |
| | Process processing condition(s) |
| | Function 1 |
| | Function 2 |
| | . . . |
| | Function n |
| Machine ID | — |
| User ID | — |
| Group ID | — |
| Machine operating system | Operating system type |
| | Operating system version |
| Machine interface | Interface protocol(s) between machines |
| | Interface parameter(s) between |

TABLE 1-continued

| Parameters of machine profile | Sub-parameters |
|---|---|
| | machines<br>Interface protocol(s) between machines and relation server<br>Interface parameter(s) between machines and relation server |

Referring to Table 1, the sub-parameters of the status parameter may include the current active state of each of the machines 101, 102, 105, and 106, information about whether each of the machines 101, 102, 105, and 106 is currently available or unavailable (i.e. in a standby state), a current process, a scheduled termination time of the current process, the currently executed function, and the scheduled termination time of the currently executed function.

The currently executed function may denote the function that is currently being executed among various functions that are executed in order to perform a single process. For example, the currently executed function may be a function such as 'washing', 'rinsing', or 'spin-drying', performed for the process 'laundering'.

The sub-parameters of the capability parameter may include the title of a process, which can be processed by each of the machines 201, 202, 204, and 205, an input parameter, an output parameter, a process processing time, a process processing condition, and multiple functions related to the executable task (function 1, function 2, function 3, . . . , function n). The input parameter may refer to information that is input in order to operate the corresponding machine, and the output parameter may refer to information that is output from the corresponding machine depending on the results of operation.

The machine ID parameter denotes a unique identifier allocated to each of the machines 101, 102, 105, and 106 to identify each of the machines 101, 102, 105, and 106.

The user ID parameter denotes a unique identifier allocated to a user who is capable of utilizing each of the machines 101, 102, 105, and 106.

The group ID parameter denotes a unique identifier allocated to a user group (e.g. members of a family, members of a specific company, etc.) that is capable of utilizing each of the machines 101, 102, 105, and 106.

The sub-parameters of the machine operating system (OS) parameter may include the type and version of the OS that is used by each of the machines 101, 102, 105, and 106.

The sub-parameters of the machine interface parameter may include interface protocols between the machines 101, 102, 105, and 106, interface parameters between the machines 101, 102, 105, and 106, interface protocols between each machine 101, 102, 105, or 106 and the relation server 104, and interface parameters between each machine 101, 102, 105, or 106 and the relation server 104.

In accordance with an embodiment, the machine profile may be defined and implemented in the form of a schema having a hierarchical structure. That is, the machine profile may be defined and implemented as a data structure having a structure system such as that given in Table 1. In this case, the machine profile may further include a tag, indicating the last portion of each parameter (or machine profile), in the last portion of each parameter (or the last portion of the machine profile).

The system 100 of FIG. 1 is a centralized system in which the machines 101, 102, 105, and 106 are grouped by the relation server 104 and the sequence of the operations of the machines 101, 102, 105, and 106 is designated.

The relation server 104 may perform a grouping for the machines that have been previously registered in the relation server 104 or that are extractable (that is, capable of being selected) by a communication with the relation server 104 among various machines.

The relation server 104 may generate a capability set required to execute a command by analyzing the command input from the user 103, and may group the machines 101, 102, 105, and 106 based on the generated capability set and the machine profiles of the machines 101, 102, 105, and 106, for example, capability parameters and status parameters.

In the present specification, the term 'analysis of a command' may be used interchangeably with the term 'analysis of a task corresponding to a command'.

According to an embodiment, the relation server 104 may form relations between the machines 101, 102, 105, and 106, based on the capability set, the capability parameters and the status parameters of the respective machines 101, 102, 105, and 106, and generate a relation profile based on the relations. The generated relation profile may be stored in the relation server 104 or a storage space associated with the relation server 104.

The term 'relation' in the present specification may mean a concept including not only machines (i.e. a machine group) associated to collaborate with each other on a process, but also a task processing schedule (e.g. the sequence of operations, a task collaborative relation, etc.) required to allow the machines to perform the process.

According to an embodiment, the present invention may further include a procedure in which the relation server 104 analyzes the command using the data prestored in the relation server 104 or in the storage space associated with the relation server 104 when the relation profile is generated. In this case, the relation server 104 may form the relations between the machines 101, 102, 105, and 106 based on the analyzed command and the capability parameters and the status parameters of the respective machines 101, 102, 105, and 106 and may generate a relation profile based on the relations.

According to an embodiment, the relation server 104 may request an intervention of a user to the user 103 according to the processes included in the relation profile. The intervention of the user may include an approval or a selection of the user related to an execution of the processes. In this case, the user 103 may transmit a result of the approval for all of the processes or the selection for a part of the processes to the relation server 104, by responding to the request from the relation server 104. The said user intervention step may be performed at various times according to an embodiment. For example, the intervention of the user may be performed after the relation profile is generated or be performed before an addition work is conducted.

According to another embodiment, the relation server 140 may request the intervention of the user to the user 103 only when a process result of the processes included in the relation profile make a critical effect on the user 103.

The relation server 104 may re-group the machines 101, 102, 105, and 106 according to the intervention (e.g. the approval of the selection) of the user 103, and may generate a new relations of the re-grouped machines. And, the relation server 104 may generate a new relation profile according to the new relations.

According to an embodiment, relation profile may include at least one of the parameters presented in the following Table 2. Each of the parameters of the relation profile may include at least one sub-parameter.

The term "task" in the present specification may mean a set of processes (or functions) that need to be performed based on the results of analyzing the command input from the user 103. And, the term "relation profile" in the present specification may broadly mean data representing relations formed to perform a task.

TABLE 2

| Parameters of relation profile | Sub-parameters |
| --- | --- |
| Capability set | Capability 1 |
| | ... |
| | Capability n |
| Grouped machines | Machine ID 1 |
| | ... |
| | Machine ID n |
| Work group ID | — |
| Task description | — |
| Task processing schedule | Process 1 |
| | Process start time |
| | Process start condition(s) |
| | Allocated machine ID |
| | Start time of function 1 |
| | Function 1 |
| | ... |
| | Start time of function n |
| | function n |
| | Predicted termination time of process 1 |
| | Interface parameter |
| | Termination condition(s) of process 1 |
| | ... |
| | Process n |
| | Process start time |
| | Process start condition(s) |
| | Allocated machine ID |
| | Start time of function 1 |
| | function 1 |
| | ... |
| | Start time of function n |
| | Function n |
| | Predicted termination time of process n |
| | Interface parameters |
| | Termination condition(s) of process n |

Referring to Table 2, the parameters of the relation profile may include a capability set parameter, grouped machine parameters, a work group ID parameter, a task description parameter, a task processing schedule parameter, etc.

The capability set parameter may include information about capability parameters, which are required for relevant task, and machines may be grouped based on the capability set parameters.

The grouped machine parameters may include information about the machine IDs (machine ID 1, . . . , machine ID n) of machines grouped to perform the relevant task.

The work group ID parameter may denote the ID required to identify the entire group of the grouped machines.

The task description parameter may include various types of additional information related to the relevant task. For example, the task description parameter may include details about the tasks for the relevant task in the form of text.

The task processing schedule parameter may include relations (e.g. a processing sequence) between multiple processes (process 1, . . . , process n) and sub-parameters related to the respective processes (process 1, . . . , process n).

According to an embodiment, the sub-parameters of the task processing schedule parameter may include the process start time of each process, the start condition(s) of each process, the machine IDs of machines allocated, the functions used, the start time of each of the functions, the predicted termination time of the process, interface parameters, the termination condition(s) of the process, etc.

According to an embodiment, the relation profile may be defined and implemented in the form of a schema having a hierarchical structure. That is, the relation profile may be defined and implemented as a data structure having a structure system, such as that given in Table 2. In this case, the relation profile may further include a tag, indicating the last portion of each parameter (or the relation profile), in the last portion of each parameter (or the last portion of the relation profile).

In the present specification, the term "capability set" may be used as a concept having a level which is equivalent to the task. For example, work, that is, a capability set corresponding to a task, such as "housework" may be composed of processes (or functions) such as "cleaning", "doing the dishes", and "doing the laundry".

According to an embodiment, the relation server 104 may list the machine ID parameters of the respective machines 101, 102, 105, and 106 grouped to execute the command and arrange the listed machine ID parameters according to the sequence of operations suitable for the execution of the command.

In this case, in the arrangement corresponding to the operation sequence, the status parameters of respective machines 101, 102, 105, and 106 may be taken into consideration. For example, when a relevant machine is found to be currently in an active state using the sub-parameters of the machine 101, 102, 105, or 106, the sequence of operations may be arranged in consideration of available times using the scheduled termination time parameter for the current active state.

For example, when a relevant machine is found to be currently in an available state using the sub-parameter indicating current availability or unavailability (standby state), among the sub-parameters of the machine 101, 102, 105, or 106, the operations of the machines may be arranged according to the sequence most suitable for the execution of the command.

According to the determined operation sequence, the relation server 104 may execute the command received from the user 103 by requesting each of the machines 101, 102, 105, and 106 to perform process.

In the system 100 of FIG. 1, the machines 101, 102, 105, and 106 may be entirely controlled by the relation server 104, and thus the machines 101, 102, 105, and 106 do not need to exchange data with each other.

The relation server 104 is not limited as to the location or form thereof as long as it is capable of communicating with the machines 101, 102, 105, and 106. For example, the relation server 104 may be implemented using a smart phone.

The machine profiles of the machines 101, 102, 105, and 106 may be previously registered in the relation server 104 and may be transmitted to the relation server 104 at the request of the relation server 104. According to an embodiment, when the machine profiles are previously registered, the relation server 104 may fixedly store the capability parameters, machine ID parameters, user ID parameters, group ID parameters, machine operating system (OS) parameters, and machine interface parameters, and may update the status parameters while communicating with the machines 101, 102, 105, and 106.

The relation server 104 may always be maintained in the state in which it is capable of communicating with the machines 101, 102, 105, and 106 by setting interface protocols and protocol parameters to be used to communicate with the machines 101, 102, 105, and 106 using the machine profiles.

The method for operating the relation server 104 will be described in greater detail with reference to the scenario of FIG. 2.

Figure 2:
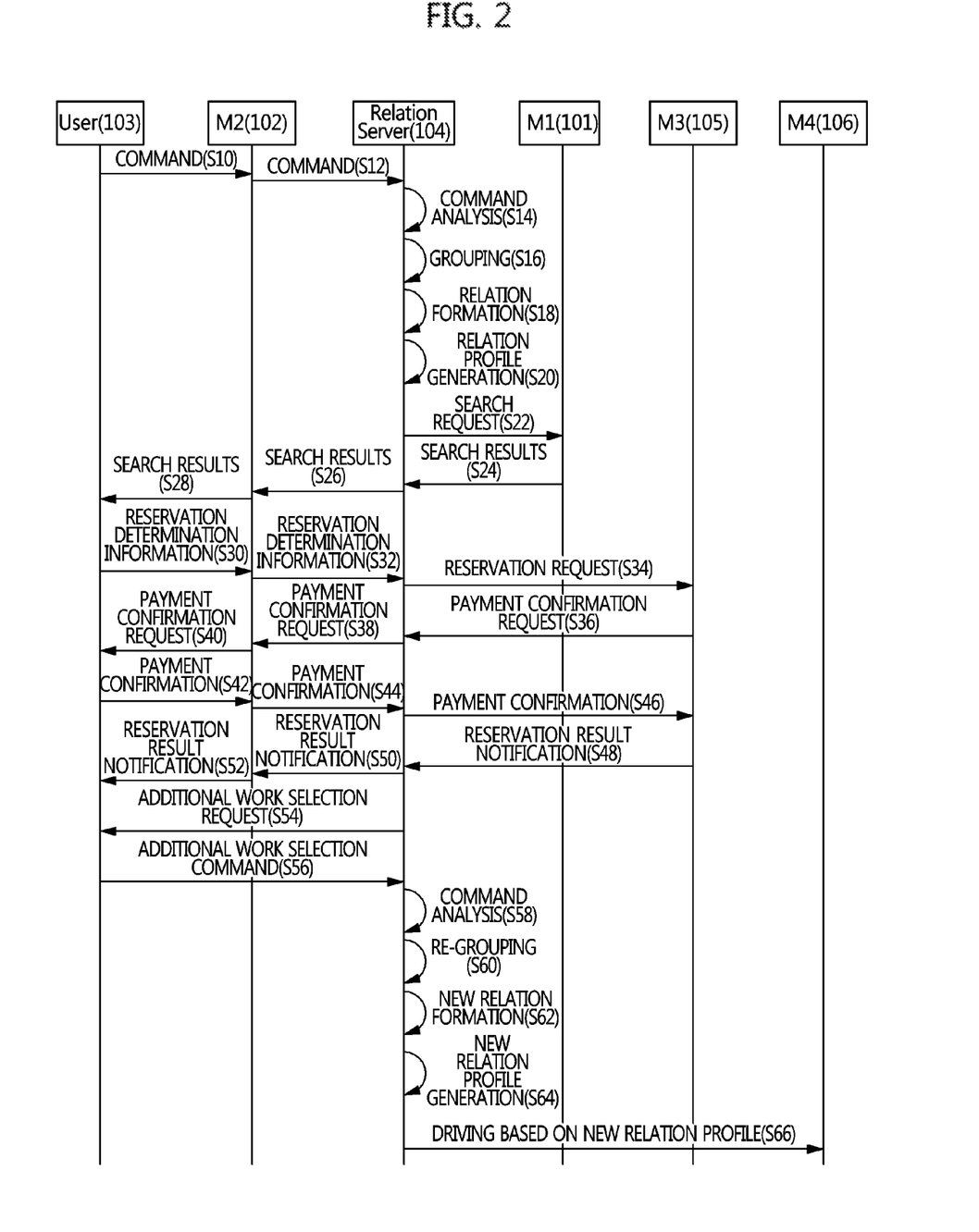
FIG. 2 illustrates an embodiment of a scenario that can be applied to the system of FIG. 1.

FIG. 2 illustrates an embodiment of a scenario that can be applied to the system of FIG. 1.

Referring to FIGS. 1 and 2, it is assumed that, in FIG. 2, the first machine 101 is a movie search engine, the second machine 102 is a smart phone, the third machine 105 is a machine having a movie reservation function (e.g. a communication terminal in which a movie reservation application is installed), and the fourth machine 105 is a boiler control machine having a communication function.

The second machine 102 may receive a command, for example, a 'movie recommendation' command, from the user 103 at step S10. According to an embodiment, the command may be received via email, a social network service (SNS), or a messenger.

The second machine 102 may forward the command received from the user 103 to the relation server 104 at step S12.

The relation server 104 may analyze the received command at step S14, and may generate a capability set required to execute the command based on the results of the analysis and group the machines 101, 102, 105, and 106, which will execute the command, based on the generated capability set, at step S16. For example, the relation server 104 may group the machines that may perform processes or functions included in the capability set required to execute the command, based on the machine profiles of the respective machines 101, 102, 105, and 106.

The relation server 104 may form relations between the machines 101, 102, 105, and 106 based on the capability parameters and the status parameters of the respective grouped machines 101, 102, 105, and 106 at step S18.

According to an embodiment, the relation server 104 may utilize machine profiles in which the capability parameters and the status parameters of the machines 101, 102, 105, and 106, which have been previously registered in the relation server 104, are included.

According to another embodiment, the relation server 104 may also use machine profiles acquired from a query that is transmitted from the relation server 104 to each of the machines 101, 102, 105, and 106.

The relation server 104 may generate a relation profile based on the relations formed between the machines 101, 102, 105, and 106 at step S20.

The relation server 104 may perform management so that the machines 101, 102, 105, and 106 perform required operations at required times depending on the relation profile.

For example, the relation server 104 may set the sequence of operations of the machines 101, 102, 105, and 106 based on the machine profiles (capability parameters, status parameters, etc.) of the respective machines 101, 102, 105, and 106, and may then arrange the machine IDs according to the set sequence and store the arranged machine IDs in the relation profile.

The relation server 104 may request the first machine 101 to search for movies using the stored relation profile at step S22.

In this case, the relation server 104 may request the first machine to search for movies based on information about movies that meet movie search conditions input by the user 103 (e.g. a movie title, a movie theater, a synopsis, a running time, or the like). According to an embodiment, the movie search conditions may be included in the command input from the user 103 at step S10.

The first machine 101 may transmit the found movie information to the user 103 via the relation server 104 and the second machine 102 at steps S24, S26, and S28.

The user 103 enters information about the determination to make a reservation (e.g. the selected movie, the selected movie theater, the movie start time, the number of tickets to be reserved, etc.) in response to the found movie information, and may deliver the information about the determination to make a reservation (reservation determination information) to the relation server 104 via the second machine 102 at steps S30 and S32.

The relation server 104 may transmit a reservation request to the third machine 105 based on the received reservation determination information at step S34.

The third machine 105 may reserve a movie corresponding to the reservation determination information, and may transmit a payment confirmation request to the user 103 via the relation server 104 and the second machine 102 at steps S36, S38, and S40.

The user 103 may transmit payment confirmation to the third machine 105 via the second machine 102 and the relation server 104 at steps S42, S44, and S46.

The third machine 105 may reserve the movie in response to payment confirmation from the user 103, and may provide notification of the results of the reservation to the user 103 via the relation server 104 and the second machine 102 at steps S48, S50, and S52.

The relation server 104 may transmit a request, which is required in order to obtain the selection or approval of work that can be additionally performed in compliance with the command of the user 103 transmitted at step S10, to the user 103 at step S54.

According to an embodiment, the relation server 104 may transmit information about a list of additional works, information about machines for processing the additional works, and information about the sequence (or schedule), in which the additional works are to be processed, to the user 103.

The user 103 may select and input additional works to be conducted, and may transmit a command for selecting the input additional works to the relation server 104 at step S56.

The relation server 104 may analyze the additional work selection command transmitted from the user 103 at step S58, generate a capability set required to execute the command based on the results of the analysis, and re-group the machines 101, 102, 105, and 106, which will collaborate in the performance of the additional works selected by the user 103, based on the generated capability set, at step S60.

The relation server 104 may form new relations between the machines 101, 102, 105, and 106 based on the capability parameters and the status parameters of the respective re-grouped machines 101, 102, 105, and 106 at step S62.

The relation server 104 may generate a new relation profile based on the newly formed relations at step S64.

Thereafter, the relation server 104 may perform management so that the corresponding machines perform required operations at required times based on the newly generated relation profile.

For example, the relation server 104 may schedule the operation of a boiler so that the boiler is driven via the fourth machine 106 in accordance with the time at which the movie is to be terminated based on movie reservation information at step S66.

According to an embodiment, after the execution of the command has been completed, the relation server 104 may release the formed relations and delete the relation profile.

Although the present invention has been described with reference to the embodiments illustrated in the drawings, those skilled in the art will understand that various modifications and other equivalent embodiments are possible from the above embodiments. Therefore, the technical scope of the present invention should be defined by the technical spirit of the accompanying claims.

The method according to the embodiments may be implemented as a program that can be executed by various computer means. In this case, the program may be recorded on a computer-readable storage medium. The computer-readable storage medium may include program instructions, data files, and data structures solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present disclosure, and vice versa.

The method and system according to embodiments of the present invention are advantageous in that machines to execute a command may be grouped based on the capability parameters and the status parameters of machines, and optimal relations between the machines grouped to execute the command may be formed.

As described above, although the embodiments have been described with reference to a limited number of embodiments and drawings, those skilled in the art will appreciate that various changes and modifications are possible from the above descriptions. For example, even if the above-described technologies are performed in a sequence differing from that of the described method, and/or components such as a system, a structure, a device, and a circuit are coupled or combined in a way differing from that of the described method or are replaced with or substitute other components or equivalents, suitable results can be achieved.

Therefore, it should be understood that other embodiments and examples and equivalents of the accompanying claims belong to the scope of the accompanying claims.

What is claimed is:

1. A relation server comprising:
   a first machine interface coupled to a first machine; and
   a storage that stores a relation profile, the relation profile including a task processing schedule parameter that defines a sequence of performing one or more processes,
   wherein the relation server is configured to:
      receive a user input including a command from a user via the first machine interface; and
      request a group of machines associated with the command based on the relation profile to execute the command by performing the one or more processes, by the group of machines, according to the sequence of the task processing schedule parameter,
   wherein the relation server is further configured to identify the group of machines associated with the command based on the relation profile,
   wherein the task processing schedule parameter includes start information of at least one process of the one or more processes.

2. The relation server of claim 1, further comprising a second machine interface coupled to a second machine among the group of machines,
   wherein the relation server is configured to execute the command by requesting the second machine to perform the one or more processes via the second machine interface.

3. The relation server of claim 1, wherein the relation server is further configured to generate a new relation profile based on an intervention by the user.

4. The relation server of claim 3, wherein the relation server is further configured to re-group the group of machines based on the new relation profile.

5. The relation server of claim 3, wherein the relation server is further configured to request the intervention to the user.

6. The relation server of claim 5, wherein the intervention of the user includes an approval or a selection of the user related to an execution of the one or more processes.

7. The relation server of claim 1, wherein the relation server is a smart phone.

8. The relation server of claim 1, wherein the group of machines is connected via a network.

9. The relation server of claim 1, wherein the storage stores at least one relation profile, each of the at least one relation profile corresponds to respective at least one command from the user.

10. The relation server of claim 1, wherein the storage stores at least one relation profile, and the command from the user corresponding one of the at least one relation profile.

11. The relation server of claim 1, wherein the first machine includes at least one of a home appliance, a smart phone or a search engine.

12. The relation server of claim 1, wherein the group of machines include the first machine.

13. The relation server of claim 1, wherein the start information includes a start condition, and the start condition is associated with the command that is included in the user input.

14. The relation server of claim 13, wherein the start condition is further associated with another command that is received from another user input during the performing the one or more processes.

15. The relation server of claim 1, wherein the start information includes a start time of at least one process of the one or more processes.

16. The relation server of claim 1, wherein the relation server is further configured to identify the group of machines associated with the command based on a status parameter in the relation profile.

17. The relation server of claim 16, wherein the relation server is further configured to identify the group of machines based on a machine state, and the machine state indicates whether at least one machine in the group of machines is available or unavailable.

18. The relation server of claim 1, wherein the relation server is maintained in a communication state with at least one machine in the group of machines.

19. A machine comprising:
a first interface configured to receive a user input including a command from a user; and
a second interface coupled to a relation server,
wherein the command is associated with a relation profile, the relation profile including a task processing schedule parameter that defines a sequence of performing one or more processes,
wherein the relation server is configured to, in response to receiving the user input from the machine via the first interface, request a group of machines associated with the command based on the relation profile,
wherein the group of machines executes the command by performing the one or more processes according to the sequence of the task processing schedule parameter,
wherein the relation server is further configured to identify the group of machines associated with the command based on the relation profile, and
wherein the task processing schedule parameter includes start information of at least one process of the one or more processes.

20. The machine of claim 19, wherein the relation profile is stored in a storage associated with the relation server.

21. The machine of claim 19, wherein the relation server includes a storage, and the relation profile is stored in the storage of the relation server.

22. The machine of claim 19, wherein the relation server is further configured to request the intervention to the user.

23. The machine of claim 19, wherein the group of machines is connected via a network.

24. The machine of claim 19, wherein the first machine includes at least one of a home appliance, a smart phone or a search engine.

\* \* \* \* \*